United States Patent
Bloechl et al.

(10) Patent No.: US 10,244,373 B2
(45) Date of Patent: Mar. 26, 2019

(54) BLE NETWORKING SYSTEMS AND METHODS PROVIDING CENTRAL AND PERIPHERAL ROLE REVERSAL

(71) Applicant: Link Labs, Inc., Annapolis, MD (US)

(72) Inventors: Mark Olden Bloechl, Elkridge, MD (US); Ricardo Luna, Jr., Las Cruces, NM (US); Patrick Li, Potomac, MD (US); Brian Emery Ray, Annapolis, MD (US)

(73) Assignee: LINK LABS, INC., Annapolis, MD (US)

( * ) Notice: Subject to any disclaimer, the term of this patent is extended or adjusted under 35 U.S.C. 154(b) by 0 days.

(21) Appl. No.: 15/626,083

(22) Filed: Jun. 17, 2017

(65) Prior Publication Data

US 2018/0367942 A1    Dec. 20, 2018

(51) Int. Cl.
| | |
|---|---|
| *H04W 4/80* | (2018.01) |
| *H04B 17/318* | (2015.01) |
| *H04W 76/10* | (2018.01) |
| *H04W 88/08* | (2009.01) |

(52) U.S. Cl.
CPC ............ *H04W 4/80* (2018.02); *H04B 17/318* (2015.01); *H04W 76/10* (2018.02); *H04W 88/08* (2013.01)

(58) Field of Classification Search
CPC ............................... H04W 4/80; H04B 17/318
See application file for complete search history.

(56) References Cited

U.S. PATENT DOCUMENTS

| | | | |
|---|---|---|---|
| 5,920,287 A | 7/1999 | Belcher | |
| 6,469,628 B1 | 10/2002 | Richards | |
| 7,141,715 B2 | 11/2006 | Shapira | |
| 7,242,294 B2 | 7/2007 | Warrior | |
| 7,411,921 B2 | 8/2008 | Strong | |
| 7,518,500 B2 | 4/2009 | Aninye | |
| 7,973,655 B2 | 7/2011 | Blinnikka | |
| 8,026,814 B1 | 9/2011 | Heinze | |
| 8,368,555 B2 | 2/2013 | Gilbert | |
| 8,712,330 B2 | 4/2014 | Desai | |
| 8,831,627 B2 | 9/2014 | Aninye | |
| 8,849,926 B2 | 9/2014 | Marzencki | |
| 9,328,857 B2 | 5/2016 | Conte | |
| 9,374,667 B1 | 6/2016 | Jorgensen et al. | |
| 9,426,616 B1 | 8/2016 | Rasband | |
| 9,439,041 B2 | 9/2016 | Parvizi | |

(Continued)

FOREIGN PATENT DOCUMENTS

WO    WO 2016/053909    4/2016

OTHER PUBLICATIONS

Bluetooth Core Specification v 5.0, Dec. 2016, pp. 252-256.

*Primary Examiner* — Tuan H Nguyen
(74) *Attorney, Agent, or Firm* — Charles B. Lobsenz; Brian H. Buck; Potomac Law Group, PLLC

(57) ABSTRACT

Provided are systems and methods for reversing the conventional roles of central and peripheral devices in a BLE network. Doing so includes implementing an end node (EN) as the sole initiator of establishing a connection between a particular EN and a particular access point (AP). Such implementation includes determining such connection based on a relative proximity of an EN to an AP, and a relative value of the connection between an EN and an AP. Accordingly, a relative location of the EN may be determined based on such proximity.

18 Claims, 6 Drawing Sheets

(56) References Cited

U.S. PATENT DOCUMENTS

| | | |
|---|---|---|
| 9,788,167 B2 | 10/2017 | Geng et al. |
| 9,992,633 B2 | 6/2018 | Geng et al. |
| 2005/0113132 A1 | 5/2005 | Irsheid |
| 2005/0250519 A1 | 11/2005 | Samuel |
| 2007/0001813 A1 | 1/2007 | Maguire |
| 2007/0004426 A1 | 1/2007 | Pfleging |
| 2007/0046459 A1 | 3/2007 | Silverman |
| 2009/0092049 A1 | 4/2009 | Hargrave |
| 2010/0131567 A1 | 5/2010 | Dorogusker |
| 2012/0311149 A1 | 12/2012 | Trevino |
| 2013/0060351 A1 | 3/2013 | Imming |
| 2013/0065603 A1 | 3/2013 | Hovav |
| 2013/0314210 A1 | 11/2013 | Schoner |
| 2013/0317944 A1 | 11/2013 | Huang |
| 2014/0149004 A1 | 5/2014 | Best |
| 2015/0282113 A1 | 10/2015 | Costa |
| 2015/0296332 A1 | 10/2015 | Lee |
| 2015/0356498 A1 | 12/2015 | Casanova |
| 2016/0012196 A1 | 1/2016 | Mark |
| 2016/0105762 A1 | 4/2016 | Singh |
| 2016/0112886 A1* | 4/2016 | Malik ................. H04W 4/80 370/225 |
| 2016/0117213 A1 | 4/2016 | Arjun |
| 2016/0127883 A1 | 5/2016 | Zhou |
| 2016/0127996 A1 | 5/2016 | Patil |
| 2016/0142868 A1 | 5/2016 | Kulkarni |
| 2016/0183042 A1 | 6/2016 | Weizman |
| 2017/0076332 A1 | 3/2017 | Jung |
| 2017/0085417 A1* | 3/2017 | O'Reirdan .......... H04L 41/0668 |
| 2018/0084588 A1 | 3/2018 | Khoury |
| 2018/0160282 A1 | 6/2018 | van de Poll |
| 2018/0160334 A1 | 6/2018 | Deshpande |

\* cited by examiner

FROM 560

BLE NETWORKING SYSTEMS AND METHODS PROVIDING CENTRAL AND PERIPHERAL ROLE REVERSAL

FIELD OF THE DISCLOSURE

Disclosed embodiments relate to wireless communications, and more specifically, to wireless communication among BLUETOOTH Low Energy (BLE) equipped devices in which conventional BLE central and peripheral roles of those devices are reversed and made applicable to nodes of a BLE-enabled network so as to enhance BLE networking capability.

BACKGROUND

Circa 2009, the Internet was in a stage of its evolution in which the backbone (routers and servers) was connected to fringe nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the fringe nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between peripheral and central devices.

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement.

However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Thus, it would be desirable to provide for one or more optimized BLE networking relationships that address and overcome the aforementioned impediments and disadvantages now associated with the conventional BLE central/peripheral networking relationship discussed above. More specifically, it would be desirable to provide applicability of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking assets to be inventoried and for which location must be determined, whether in a commercial or residential setting, as well as any other application in which a BLE networking protocol is deployed.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes a BLE communications system, including an end node (EN), and an access point (AP) configured to transmit a beacon advertisement message, in which the EN is configured to detect the beacon advertisement message, and initiate a connection with the AP.

A further aspect of the embodiments includes a method of BLE communication, including transmitting a beacon advertisement message from an access point (AP), detecting the beacon advertisement message, at an end node (EN), and initiating a connection between the AP and the EN, at the EN.

A further aspect of the embodiments includes a BLE communications system, including an end node (EN), and a plurality of access points (APs) comprising connectable and non-connectable APs, in which the EN, solely, determines a closest proximity of an AP to the EN, based on a measurement of a received signal strength (RSS) of a signal transmitted from a specified one of the APs, the selection being further in response to a Bayesian maximum a posteriori (MAP) estimation of each of the respective RSSs received from the plurality of APs.

A further aspect of the embodiments includes, in a BLE communications system, a method of connecting a BLE end node (EN) with a BLE access point (AP), including detecting, by the EN, a beacon advertisement message respectively transmitted by one or more connectable BLE APs, and establishing, by the EN, a connection with a selected, specified connectable BLE AP, from among the one or more BLE APs, in response to the selected, specified connectable BLE AP being associated with a connection value greater than a connection value associated with another, connectable BLE AP.

A further aspect of the embodiments includes, in a BLE communications system, a method of determining a location of a BLE end node (EN) through association with one or more of a plurality of connectable and/or non-connectable BLE access points (APs), including detecting, at the EN, a beacon advertisement message transmitted by an AP, determining, at the EN, whether the AP transmitting the beacon advertisement message is most proximate to the EN, determining, at the EN, whether the AP transmitting the beacon advertisement message is a connectable AP, and in response to determining that the AP transmitting the beacon advertisement message is most proximate to the EN and not a connectable AP, determining whether another AP is a connectable AP, and in response to determining that the another AP is connectable, the EN initiating and establishing a connection with the another AP, and transmitting to the another AP identifying information of the EN, identifying information of the non-connectable AP and/or contained information of the EN so as to provide each of a relative location of the EN with respect to the non-connectable AP, and the contained information of the EN, wherein the proximity of the EN to a respective AP, whether connectable or non-connectable, is determined according to a confidence value representing a level of expectation that a respective AP is most proximate to the EN, and the established connection with the another AP is in response to the another AP comprising a highest connection value among connectable ones of the plurality of APs, based on the confidence value.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
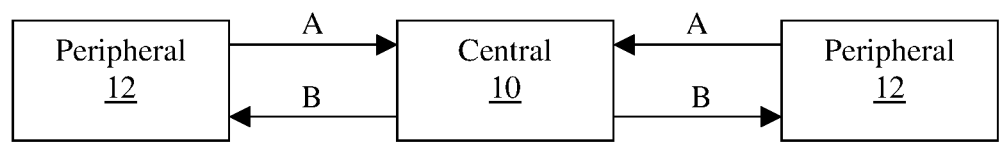
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are prescribed by the BLUETOOTH Core Specification 4.0 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B."

Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
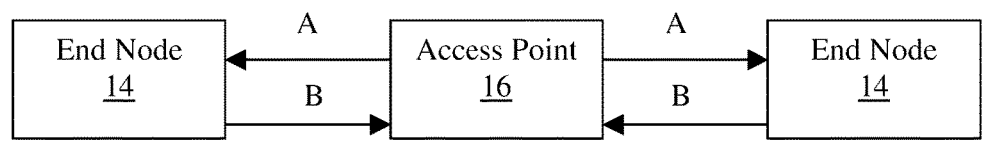
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary BLE end nodes (ENs) 14 are responsible for detection of a beacon advertisement message transmitted from an exemplary BLE access point (AP) 16 in the direction of arrows "A," and moreover, whereby such ENs 14 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective EN 14, and whereas such aspect or aspects, rather, are solely evaluated and/or determined by the EN 14 so that the EN 14, itself, is enabled to then solely initiate and/or establish the aforementioned connection, if doing so is deemed appropriate by the EN 14. Herein, the term, "initiate" means taking any initial steps or enacting any initial procedures, and the terms, "establish," or "established" mean taking any steps or enacting any procedures related to whether to cause and/or maintain a connection between an AP 16 and an EN 14, and thereafter making and/or maintaining such connection.

Figure 3:
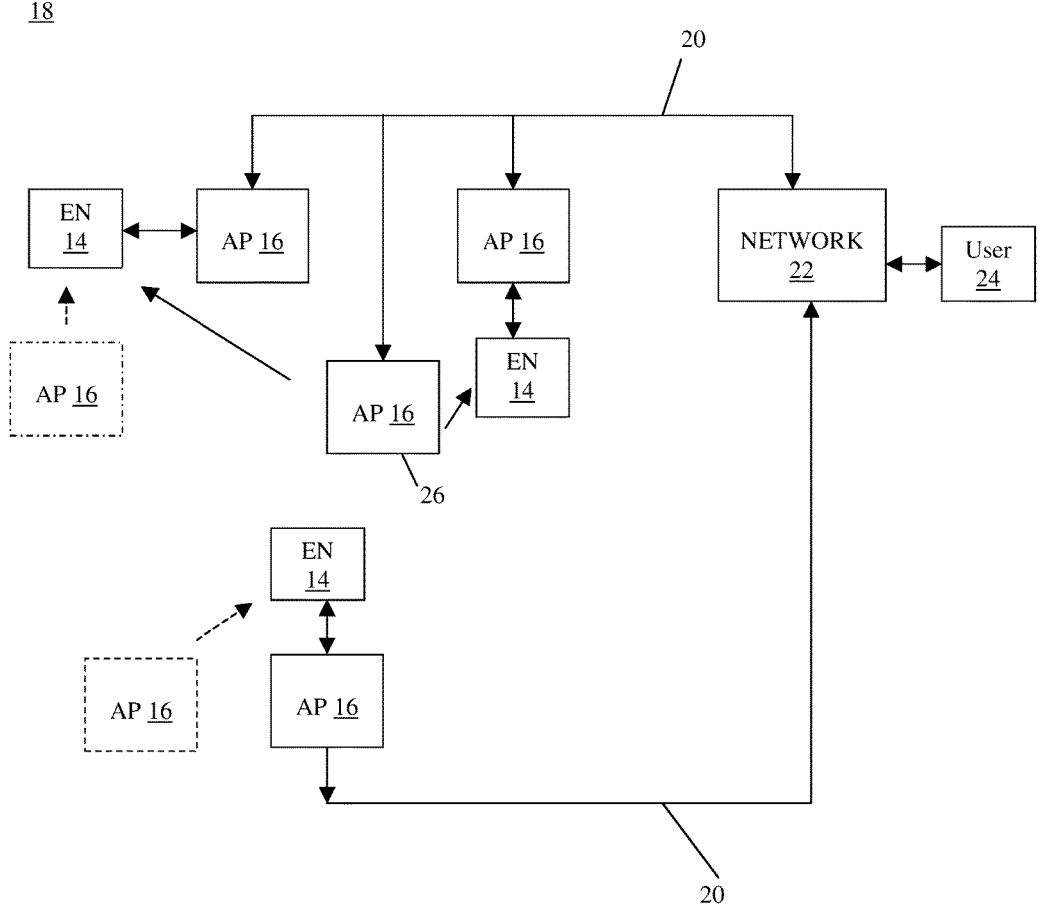
FIG. 3 is an illustration of a BLE-enabled network in accordance with FIG. 2.
Figure 4:
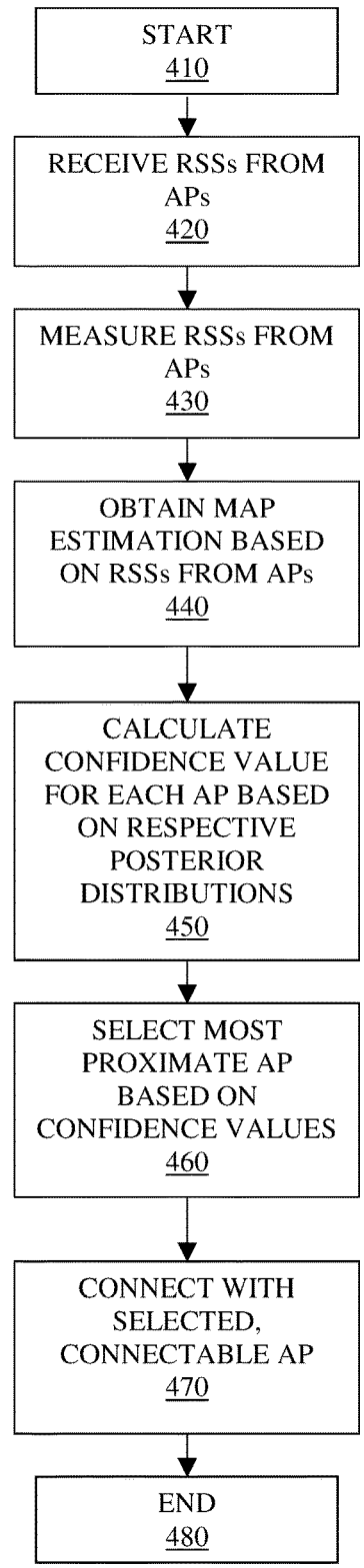
FIG. 4 is a sequence diagram of proximity association of a BLE EN with a BLE AP, in accordance with FIG. 3.
Figure 5:
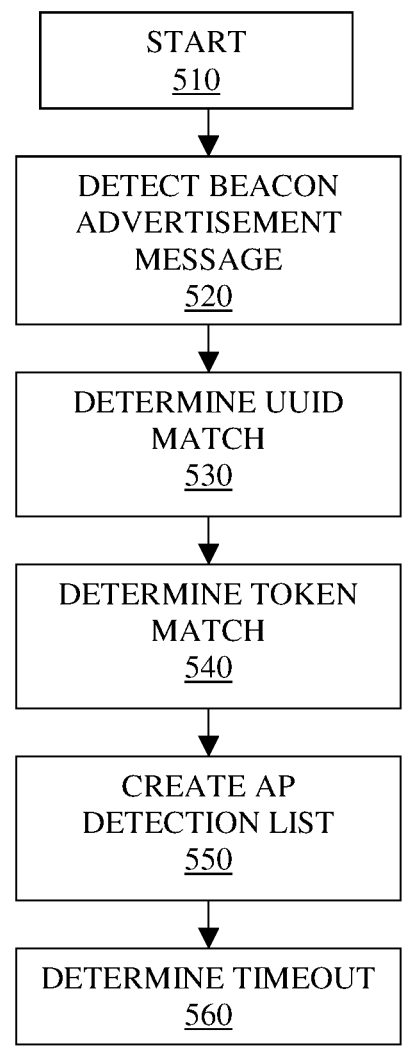
FIG. 5 is a sequence diagram of detection, by a BLE EN, of a BLE AP, in accordance with FIG. 3.
Figure 6:
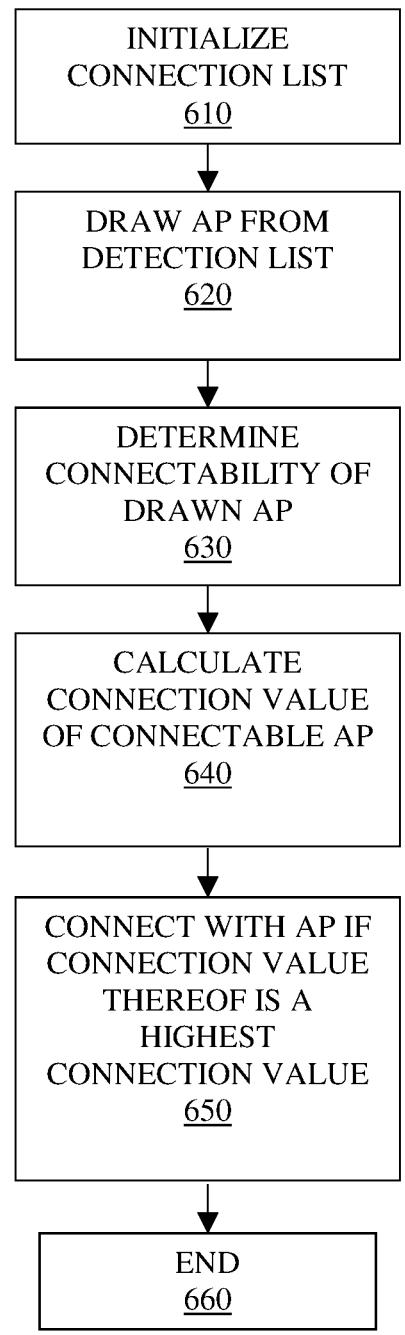
FIG. 6 is a sequence diagram of connection, by the BLE EN, with the BLE AP, in accordance with FIGS. 3 and 5.

FIGS. 3-6 and their accompanying descriptions below address various manner of associating an EN 14 to an AP 16. Therein, FIG. 3 illustrates a BLE-enabled network and communications system thereof, FIG. 4 illustrates a manner of proximity association of a BLE EN to a BLE AP, FIG. 5 illustrates a manner of detection, by a BLE EN, of a BLE AP, and FIG. 6 illustrates a manner of connection, by a BLE EN, with a BLE AP. Throughout, it is to be understood that an EN 14 does not, at any time, transmit to an AP 16 its location, but rather, the location of the EN 14 may be determined by relative association of one or more APs 16.

Specifically, FIG. 3 illustrates a BLE-enabled network 18 and communications system thereof according to the present embodiments in which ENs 14 detect a received signal strength (RSS) of all beacon advertisement messages transmitted from the APs 16, solely determine proximity with respect to the APs 16, and further, solely initiate and establish all connections therebetween the ENs 14 and APs 16, in response to having evaluated and/or made a decision with respect to, for example, such RSS, information contained in the beacon advertisement message, and/or other information, as discussed below in regard to FIGS. 4-6. Once a connection between an EN 14 and an AP 16 is made, data such as, optionally, identifying information, other than location information, of the EN 14 and identifying information of, other than the connected AP 16, the most proximate AP 16, and contained information of the EN 14 including, for example, sensory information thereof, may be transferred to the respective AP 16 for delivery through a backhaul 20, implemented by a cellular, WiFi, Low Power Wide Area Network (LPWAN) configuration, to a network or cloud service 22 for transfer to an end user terminal 24, such as a personal computing or other electronic device enabled to convey the aforementioned information. Pertinent identifying and/or location information of the APs 16 are known to the network 22.

As mentioned, EN 14 may transmit identifying information of the AP 16 which is most proximate the EN 14. Such AP 16 may or may not be an AP 16 which is connectable to the network 22, as is explained below. In these regards, it is to be understood that an AP 16 is connectable if able to connect to the network 22 via backhaul 20, and as non-connectable if unable to make such connection. For instance, non-connectable APs 16, which may or may not be present in the network 18 according to FIG. 3, are shown in dashed lines, as are transmissions of their beacon advertisement messages.

Further, it is to be understood that, while communications between an EN 14 and AP 16 are discussed herein in the context of the BLE protocol, it is contemplated that such communication may also be optionally achieved according to another wireless protocol, as appropriate. Also, it is to be understood that EN 14 and AP 16 are exemplary of first and second network nodes, respectively, which may be similarly configured as are EN 14 and AP 16 to carry out communications with respect to the BLE networking described herein and/or according to the other, appropriate wireless protocol discussed above.

In an exemplary case in which a respective EN 14 is mobile, the EN 14 is configured with an estimator comprising appropriate software and/or hardware for estimating proximity to a given AP 16, based on RSS, and is also configured with appropriate software and/or hardware for performing all operations associated with initiating and/or establishing a connection with an AP 16.

The estimator conducts a Bayesian Estimation, and specifically a maximum a posteriori (MAP) estimation for each AP 16 encountered by the mobile EN 14 at the time of the encounter, i.e., at the time of receipt of a beacon advertisement message from the respective AP 16. Furthermore, the EN 14 and its estimator may also be configured to undertake the MAP estimation at any time during operation of the EN 14. The estimation is given by the following Equation (1), $$p(x_t|y_{1:N}) = p(y_{1:N}|x_{1:N}) \int p(x_t|x_{t-1}) p(x_{t-1}|y_{t-1}) dx_{t-1} \quad \text{Equation (1)}$$

In this way, the posterior distribution, $p(x_t|y_{1:N})$, for a given proximity between a particular EN 14 and AP 16 pair at time, t, is determined. In particular, such determination is made by advancing the next most previous posterior, $p(x_{t-1}|y_{t-1})$ from time, t−1, to the current time, t, given $p(x_t|x_{t-1})$. It is contemplated that a variance of the previous estimate, $p(x_{t-1}|y_{t-1})$, is increased by a predetermined rate. Accordingly, a new posterior estimate may be obtained based on all observations by an EN 14 in accordance with Equation (2), as follows:

$$p(y_{1:N} | x_{1:N}) = \prod_{i=1}^{N} p(y_i | x_i). \quad \text{Equation (2)}$$

Therein, $x_i$ represents a variable distance from an EN 14 to an AP 16, $y_i$ represents a RSS of a beacon advertisement message and N represents a number of observations, i.e., a number of received beacon advertisement messages. In this regard, the highest value, or minimum variance, distribution is chosen as the MAP estimate.

Once the MAP estimate is obtained, a confidence value, representing a level of expectation that a respective AP 16 is most proximate to the EN 14, is calculated for each AP 16 encountered by the EN 14, based on the estimated posterior distribution and Equation (3) below, and insofar as a 10 dB predetermined variance in RSS is set as an optional, acceptable variance therefor:

$$P_{10dB} = 1 - 2Q\left(\frac{10 \text{ dB}}{\sigma_{posterior}}\right). \quad \text{Equation (3)}$$

Thus, it is to be understood that another variance level could be set as the predetermined variance depending upon, for example, device configuration(s) of one or more of the AP 16 and EN 14.

Selection of which AP 16 is most proximate to the EN 14 is determined as that AP 16 which yields the highest confidence value. However, if a further AP 16 yields a next most confident value corresponding to a predetermined tolerance for the confidence value, selection of the AP 16 that is most proximate to the EN 14 is determined from among all of the APs 16 which have broadcast a beacon advertisement message received by the EN 14. Still further, a signal strength from a respective AP 16 may be adjusted, in accordance with an adjustment factor included in the beacon advertisement message, to confer exclusive selection thereof by the EN 14, i.e., any other AP 16 whose beacon advertisement message the EN 14 has received is excluded from being considered as being most proximate to the EN 14. It is to be understood, that the estimator of a particular EN 14 may be configured to create a statistical fingerprint of AP 16 associations so as to optimize interpretation of future association patterns.

FIG. 4 sets forth a sequence of the above proximity determination enabling association of a respective EN 14 to a respective AP 16.

Therein, flow begins at decision block 410 and proceeds to decision block 420 at which an EN 14 receives a RSS from one or more APs 16. Thereafter, at decision block 430, the EN 14 measures the RSSs. At decision block 440, the estimator, which is configured integrally with the EN 16, calculates a MAP estimation for each of the RSSs. Subsequently, at decision block 450, EN 14 calculates a confidence value from each of the estimated posterior distributions. At decision block 460, the AP 16 yielding a highest confidence value is selected as the most proximate AP 16 to the EN 14. Flow then proceeds to decision blocks 470-480 in response to the selection by the EN 14. At decision block 470, EN 14 records the selection of the AP 16 according to identifying information thereof, including, for example, its network address or other appropriate networking identifying information. At decision block 480, the proximity association process ends.

Furthermore, it is contemplated that EN 14 may modulate its behavior depending upon certain conditions. For example, EN 14 may vary the frequency with which it conducts its MAP estimate depending upon whether the EN 14 is stationary or moving. That is, EN 14 may perform its estimation more frequently if it is moving, and less often if it is stationary. Still further, EN 14 may be configured to perform some predetermined action depending upon whether it is at a predetermined location (e.g., activate a light-emitting device (LED) or alarm) and/or whether no further AP 16 is detected (e.g., deactivate a device).

Additionally, and in accordance with FIGS. 5-6, the decision as to which AP 16 a mobile EN 14 should connect with, and to which it may transmit the identifying information of the most proximate AP 16, is determined based on attainment of a highest connection value calculated by the mobile EN 14. That is, as a mobile EN 14 moves in proximity to one or more APs 16, the value of connection with any one of the APs is assessed based on several components including the confidence value, in accordance with FIG. 4, and an associated weighting factor, a network loading value and an associated weighting factor, and an association factor of the broadcasting AP 16, and is given by the following Equation (4):

$$\sigma = \alpha \cdot P + \beta \cdot L + \gamma, \text{ in which} \quad \text{Equation (4)}$$

σ represents the connection value, as an absolute value, α represents a weighting factor assigned to the confidence value calculated by the EN 14, P represents the confidence value, β represents a weighting factor assigned to loading of the connected network, L represents a loading value of the connected network and is included in the beacon advertisement message, and γ represents an association factor for a respective AP 16, such that γ equals zero if the EN 14 has not made a previous connection with the respective AP 16 and equals a predetermined highest value if the respective AP 16 is the AP 16 with which the EN 14 has made a most previous connection.

In this way, an EN 14 that moves among various APs 16, which may or may not be connectable to the network 22, may determine an optimal connection among such APs 16 based on the aforementioned components yielding the highest connection value in accordance with Equation 4.

Once such connection is made, as indicated by the exemplary double arrows of FIG. 3, the connected AP 16 may receive from the EN 14 the identifying information of another AP 16 that is most proximate in a case in which the connected AP 16 has been determined to have attained the highest connection value, but not the highest confidence value. The other, most proximate AP 16 may be any of the following: a non-connectable AP 16, or another connectable AP 16, indicated at 26 in FIG. 3, to which connection has not been made due to it not achieving the highest connection value. Thus, it is to be understood that the consideration of the confidence value in Equation 4 increases the likelihood that the most proximate AP 16 is the one to which EN 14 connects. However, this scenario is not certain given connectability of one or more APs 16 and other considerations used in determining the connection value according to Equation 4.

The manner of determining the above optimal connection at the mobile EN 14 is demonstrated by the flow of FIGS. 5-6. FIG. 5 provides a sequence for scanning for detection of a beacon advertisement message respectively transmitted from one or more APs 16, while FIG. 6 provides a sequence for determining an AP 16 with which the EN 14 should connect, based on the above-discussed connection value, σ, as determined in accordance with Equation 4.

Flow begins in FIG. 5 at decision block 510 and proceeds to decision block 520 at which EN 14 scans for and detects a respective beacon advertisement message from one or more APs 16, whose identifying and/or location information is known to the network 22. Thereafter, at decision block 530, EN 14 processes a detected beacon advertisement message to determine a Universally Unique Identifier (UUID) match wherein identifying data of the AP 16 broadcasting the beacon advertisement message is confirmed as belonging to the network 22. From there, flow proceeds to decision block 540 to determine and confirm a token match. If a match is confirmed at 540, the broadcasting AP 16 is, at decision block 550, added to a list of detected APs 16 ("detection list") for which decisions at blocks 530 and 540 have been confirmed. During operation of the estimator at decision blocks 520-540, the estimator of EN 14 calculates respective confidence values for the detected APs, and records each of the respective confidence values for the detected APs 16 such that attained confidence value is associated with a respective, detected AP 16 when such AP 16 is added to the detection list, and also its selection of the most proximate AP 16. Thereafter, it is determined at decision block 560 whether the scanning operation has timed out. If not, as in the case of negative decisions at decision blocks 530 and 540, scanning continues. If the scanning operation has timed out, flow proceeds, as shown in FIG. 6, to determine which AP 16, from among the detection list, the EN 14 should connect.

Based on a timeout having occurred and the detection list, flow then proceeds, from decision block 560, to decision block 610 of FIG. 6 so as to initialize a list of APs 16 to which the EN 14 should connect (so as to provide a "connection list"). Once this connection list is initialized, an AP 16, with its associated confidence value, is drawn from the detection list, at decision block 620, at which point it is then determined, at decision block 630, if such AP 16 is connectable to the network 22 of FIG. 3, for example. If the drawn AP 16 is connectable, flow then proceeds, with respect to such drawn AP 16, to decision block 640 whereat a connection value therefor is calculated in accordance with Equation (4). Flow is then iterative through decision blocks 620-640 until detection list provided at decision block 550 is empty. From among respective connection values calculated at decision block 640, EN 14 selects and connects with, at decision block 650, the AP 16 having a highest connection value in accordance with Equation (4), and proceeds to an end at decision block 660 once connection is established.

During that connection, however, identifying information, other than location information, of an AP 16 which is determined to be most proximate to the EN 14, but non-connectable to the network 22, may be transmitted, by the EN 14, to the AP 16 with which the aforementioned connection has been established.

In this way, the aforementioned proximity determination according to the discussed confidence value serves the dual purpose of both determining which AP 16, whether the AP 16 is connectable or non-connectable, is most proximate to an EN 14, and providing a basis for determining which AP 16 the EN 14 should connect. That is, the AP 16 with which the EN 14 ultimately connects may receive identifying information of a non-connectable AP 16 that is most proximate to the EN 14 so that a relative determination of the location of the EN 14 may be determined with reference to this latter, non-connectable AP 16. In this way, the granularity of the proximity determination above is increased such that non-connectable APs 16, and not only connectable APs 16, are each considered by the estimator of EN 14 so as to render available a more accurate AP/EN proximity association.

Accordingly, as mobile EN 14 moves in and out of range of one or more APs 16, connection with a respective one thereof may be made based upon the aforementioned confidence and connection values, such that the connected AP 16 likewise may yield a highest confidence value so as to be most proximate to the EN 14, and represent the optimal connection according to Equation (4). In this case, such proximity will be made known to the user 24 by virtue of the established connection and the lack of any other AP 16 identifying information being transferred to the network 22.

Such ability of a EN 14 to select and connect with a specified, respective one of APs 16 removes the shortcomings of conventional BLE networking by enabling a mobile EN 14 to have the autonomy necessary to initiate and/or establish connection with an AP 16 solely in response to its own evaluation and decisionmaking with respect to aspects contributing to the aforementioned proximity association, connection value and/or other information associated with the EN 14. For instance, such other information may optionally include one or more parameters relating to operation of the EN 14.

In removing the aforementioned shortcomings, it will be apparent that the embodiments discussed herein eliminate the conventionally overwhelming number of advertisements transmitted by peripherals in conventional BLE networking. That is, the present embodiments substantially reduce the number of advertisements occurring at a given time by virtue of the BLE role reversal, discussed herein, in which plural end nodes receive, rather than transmit, advertisements in the form of beacon advertisement messages from one more access points.

Once connected, the EN 14 may then transfer its own identifying information, other than location information, and identifying information of the most proximate AP 16. In this way, when information of an AP 16 other than the connected AP 16 is not transferred, it will be understood that the connected AP 16 is most proximate to the EN 14. Concurrently with the transfer of the above information, the EN 14 may also transfer one or more of its contained information including sensory information, access information, notification information, alarm information, and any other status and/or content information thereof as may be applicable to its particular configuration. For instance, it is contemplated that EN 14 may transfer any of the aforementioned types of information so as to be applicable to such environments including a workplace or other type of commercial environment in which commerce is a purpose, a residence, and a medical facility or other facility in which tracking of persons or objects is necessary and/or desired.

The following examples describe instances of associating a particular end node (EN) 14 to a particular access point (AP) 16. Further, such examples are set forth in the context of the BLE-enabled network 18 of FIG. 3 and with the exemplary understanding that an EN 14, which may be defined as a BLE tag and/or a BLE tag attached to or associated with a particular object, is seeking association with a BLE AP 16 that is configured to report information of the tag to an end user 24 via backhaul 20 and network 22. In these regards, it is contemplated that EN 14 and AP 16 may be embodied as being any stationary and/or mobile nodes of an appropriate wireless network, and as being capable of operating according to a BLE protocol or other protocol in which such nodes may operate as respective first and second nodes according to any of FIGS. 4, 5, and/or 6. Also, in these regards, it is to be understood that a respective EN 14 may be configured to calculate its confidence and connections values at the same time, or, at different times. It is to be understood that EN 14 may undertake any of the processes of FIGS. 4-6 at any time, whether the EN 14 is mobile or stationary. Thus, the EN 14 is configured to optimize, at least, a rate at which connection may be established, with respect to, at least, proximity of such connection as well as the efficiency of such connection, as will be understood based on the components of Equation (4).

In a first instance, it is contemplated that such tag is attached to an object, such as a hospital bed for which it is desirous to know the location thereof at any given point in time when it is moving throughout a hospital environment. Thus, assume that the hospital bed, with the tag attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs whose location is known to the hospital network. As that travel occurs, the tag attached to the bed will scan for beacon advertisement messages transmitted from the various APs. Upon receipt of the transmitted signals, the tag is configured to conduct the MAP estimation discussed hereinabove and calculate a highest confidence value for the AP that is in closest proximity at a given point in time and which may or may not be connectable to the hospital network. The tag is further configured to connect with a particular connectable AP having a highest connection value, as shown by the exemplary double arrows extending between an exemplary EN 14 and AP 16 of FIG. 3, so that the identifying and other information of the closest proximity AP may then be transferred to the end user. In this way, as the bed and attached tag may continue to move, the process of determining proximity of the tag to both connectable and non-connectable tags continues until, optionally, such point in time when the bed and attached tag are stationary such that identifying information of a further, different AP need not be reported.

More particularly, and continuing with the example scenario above, the attached tag is alternatively, and optionally, configured to conduct a scan of broadcasting APs and assess their UUID and token information so as to qualify those APs to be included on a detection list resulting from the scan and from which connection with a specified one thereof will occur in order to transfer the tag's identity, identity information of the AP to which the tag is most proximate, and/or contained information of the tag to an end user. Once this detection list is compiled and scanning is completed, embodiments of the present disclosure contemplate the tag being configured to initialize a connection list of APs, from among the APs compiled on the detection list. Once initialized, the tag is further contemplated to conduct a determination of whether an AP is connectable to the network 22 via backhaul 20 so as to be able to transfer information of the tag to an end user desirous of knowing the location of the hospital bed. Each connectable AP is then evaluated as to its associated connection value in accordance with Equation (4) above.

More specifically, the connection value for each AP, that is determined to be connectable to the network 22, is assessed based on components comprising a confidence value representing a level of expectation that a respective AP is most proximate to the tag and an associated weighting factor, a network loading value and an associated weighting factor, and an association factor of the AP. In regard to the association factor, it is contemplated that such factor be deemed to have a value of zero if the tag has not connected with the AP being evaluated, and to have a highest value if the tag has had its most recent connection with that AP. In this way, those connectable APs for whom a connection value has been evaluated by the tag will yield an AP having a highest connection value. As such, the tag will then select that AP as the AP with which to initiate and establish a connection enabling the transfer of pertinent information of the tag, including identity information of the AP to which the tag is most proximate, to the end user.

In these ways, it will be understood that the embodiments disclosed herein optimize the efficiency of a BLE-enabled network by, at least, reducing burdens on network resources, as well as by enhancing the likelihood of connection in situations in which multiple end nodes are co-located. It will likewise be understood that the embodiments disclosed herein enable a determination of the relative location of an end node in view of its proximity to an access point, whether or not such access point is connectable or non-connectable.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLE communications system, comprising:
an end node (EN); and
an access point (AP) configured to connect to a network and transmit a beacon advertisement message,
in which the EN is configured to
detect the beacon advertisement message, and
initiate a connection with the AP in which, as a result of the connection, the AP is caused to transfer to the network identifying information of each of the EN and the AP,
wherein the EN determines whether to initiate the connection with the AP in response to evaluating from the detected beacon advertisement message at the time of transmission of the beacon advertisement message each of at least (a) whether a proximity of the AP to the EN is a nearest proximity and (b) a loading of the network to which the AP is connected.

2. The BLE communications system of claim 1, wherein:
the EN is configured to transmit contained information associated therewith to the AP, in response to the initiated connection.

3. The BLE communications system of claim 2, wherein:
the AP is configured to transmit each of the identifying and the contained information associated with the EN to an end user through transmission across a backhaul comprising any one of cellular, WiFi and LPWAN.

4. The BLE communications system of claim 1, wherein:
the EN, solely, determines that the AP is nearest in proximity to the EN, based on a measurement of a received signal strength (RSS) of the transmitted beacon advertisement message, and further finally determines that the AP is nearest in proximity in response to the EN by conducting a Bayesian maximum a posteriori (MAP) estimation of each of received signal strengths (RSSs) resulting from multiple transmissions of the beacon advertisement message.

5. The BLE communications system of claim 4, wherein:
a confidence value, representing a level of expectation that the AP is most proximate to the EN, is calculated by the EN based on each of an estimated posterior distribution and a predetermined variance with respect to each of the RSSs for the multiple transmissions of the beacon advertisement message.

6. The BLE communications system of claim 5, wherein:
the EN determines the AP as being nearest in proximity to the EN based on the confidence value for the AP comprising a highest confidence value from among the measured RSSs.

7. A method of BLE communication between a BLE access point (AP) configured for connection to a network and a BLE end node (EN), comprising:
executing, by one or more processors among the AP and the EN, a set of instructions stored among the AP and the EN for
transmitting a beacon advertisement message from the AP;
detecting the beacon advertisement message, at the EN; and
initiating a connection between the AP and the EN, at the EN, in which, as a result of the connection, the AP is caused to transfer to the network identifying information of each of the EN and the AP,
wherein the EN determines whether to initiate the connection with the AP in response to evaluating from the detected beacon advertisement message at the time of transmission of the beacon advertisement message each of at least (a) whether a proximity of the AP to the EN is a nearest proximity and (b) a loading of the network to which the AP is connected.

8. The method of BLE communication of claim 7, wherein:
the EN is configured to transmit contained information associated therewith to the AP, in response to the initiated connection.

9. The method of BLE communication of claim 8, wherein:
the AP is configured to transmit each of the identifying and the contained information associated with the EN to an end user through transmission across a backhaul comprising any one of cellular, WiFi and LPWAN.

10. In a BLE communications system, a method of connecting a BLE end node (EN) with one of a plurality of BLE access points (APs) that are connectable to a network, comprising:
executing, by one or more processors among each of the APs and the EN, a set of instructions stored among each of the APs and the EN for
transmitting a respective beacon advertisement message from at least a first AP and a second AP
detecting, by the EN, the respectively transmitted beacon advertisement messages; and
initiating, by the EN, a connection with the first AP or the second AP in response to the first AP or the second AP being selected to have a connection value greater than a connection value associated with the other thereof, in which, as a result of the connection, the first AP or the second AP is caused to transfer to the network identifying information thereof and identifying information of the EN, wherein the EN determines whether to initiate the connection with the first AP or the second AP in response to evaluating from the detected beacon advertisement messages at the time of transmission of the beacon advertisement messages each of at least (a) whether a proximity of the first AP or the second AP to the EN is a nearest proximity and (b) a loading of the network to which the first AP or the second AP is connected.

11. The method of claim 10, wherein:
the connection value is based on components comprising a confidence value representing a level of expectation that the first or second AP is most proximate to the EN and a confidence value weighting factor, a network loading value for the connected network and a network loading value weighting factor, and an association factor for the first AP or the second AP.

12. The method of claim 11, wherein:
a value of the association factor is based on whether the first AP or the second AP has most recently connected with the EN.

13. The method of claim 12, wherein:
the value of the association factor is selected as a greatest value thereof in response to a most previous connection by the EN having been made with the first AP or the second AP.

14. The method of claim 13, wherein:
the connection value is given by the equation, $$\sigma = \alpha \cdot P + \beta \cdot L + \gamma, \text{ in which}$$

$\sigma$ represents the connection value, as an absolute value, $\alpha$ represents a weighting factor for the confidence value, P represents the confidence value, $\beta$ represents the network loading value weighting factor assigned to loading of the network to which the first AP or second AP is connected, L represents the loading value of the connected network, and $\gamma$ represents the association factor for the first AP or the second AP.

15. The method of claim 14, wherein:
the evaluation of the connection value is performed by the EN.

16. The method of claim 10, wherein:
the evaluation of the connection value is performed by the EN.

17. In a BLE communications system, a method of determining a location of a BLE end node (EN) through evaluation by the EN of one or more of a plurality of BLE access points (APs), based on connectability of each of the plurality of APs to a network and proximity of each of the plurality of APs to the EN, comprising:

executing, by one or more processors among each of the plurality of APs and the EN, a set of instructions stored among each of the APs and EN for transmitting a beacon advertisement message from each of respective ones of the plurality of APs;

detecting, at the EN, the beacon advertisement message transmitted by a first AP and a second AP of the plurality thereof;

determining, at the EN, whether the first AP is most proximate to the EN, based on the beacon advertisement message transmitted therefrom;

determining, at the EN, whether the first AP is connectable to the network, and
in response to determining that the first AP transmitting the beacon advertisement message is most proximate to the EN and not connectable to the network, determining whether a second AP is connectable to the network, and
in response to determining that the second AP is connectable to the network, the EN is configured to initiate a connection with the second AP, and transmit to the second AP identifying information of the EN and (a) identifying information of the first AP, or (b) contained information of the EN, or (c) a combination of (a) and (b), so as to enable determination of each of a relative location of the EN with respect to the first AP when the identifying information of the first AP is transmitted and the contained information of the EN when transmitted, wherein
a proximity of the EN to the first AP is determined according to a first confidence value representing a level of expectation that the first AP is most proximate to the EN, and
the initiation of the connection with the second AP is in response to the second AP comprising a highest connection value among connectable ones of the plurality of APs, the connection value comprising a second confidence value representing a level of expectation that the second AP is most proximate to the EN.

18. The method of claim 17, wherein:
the connection value is given by the equation, $$\sigma = \alpha \cdot P + \beta \cdot L + \gamma, \text{ in which}$$

$\sigma$ represents the connection value, as an absolute value, $\alpha$ represents a weighting factor for the second confidence value, P represents the second confidence value, $\beta$ represents a weighting factor assigned to loading of the network to which the second AP is connected, L represents a loading value for the network, and $\gamma$ represents an association factor for the second AP that is based on whether the second AP has most recently connected with the EN.

* * * * *